Figure 1:
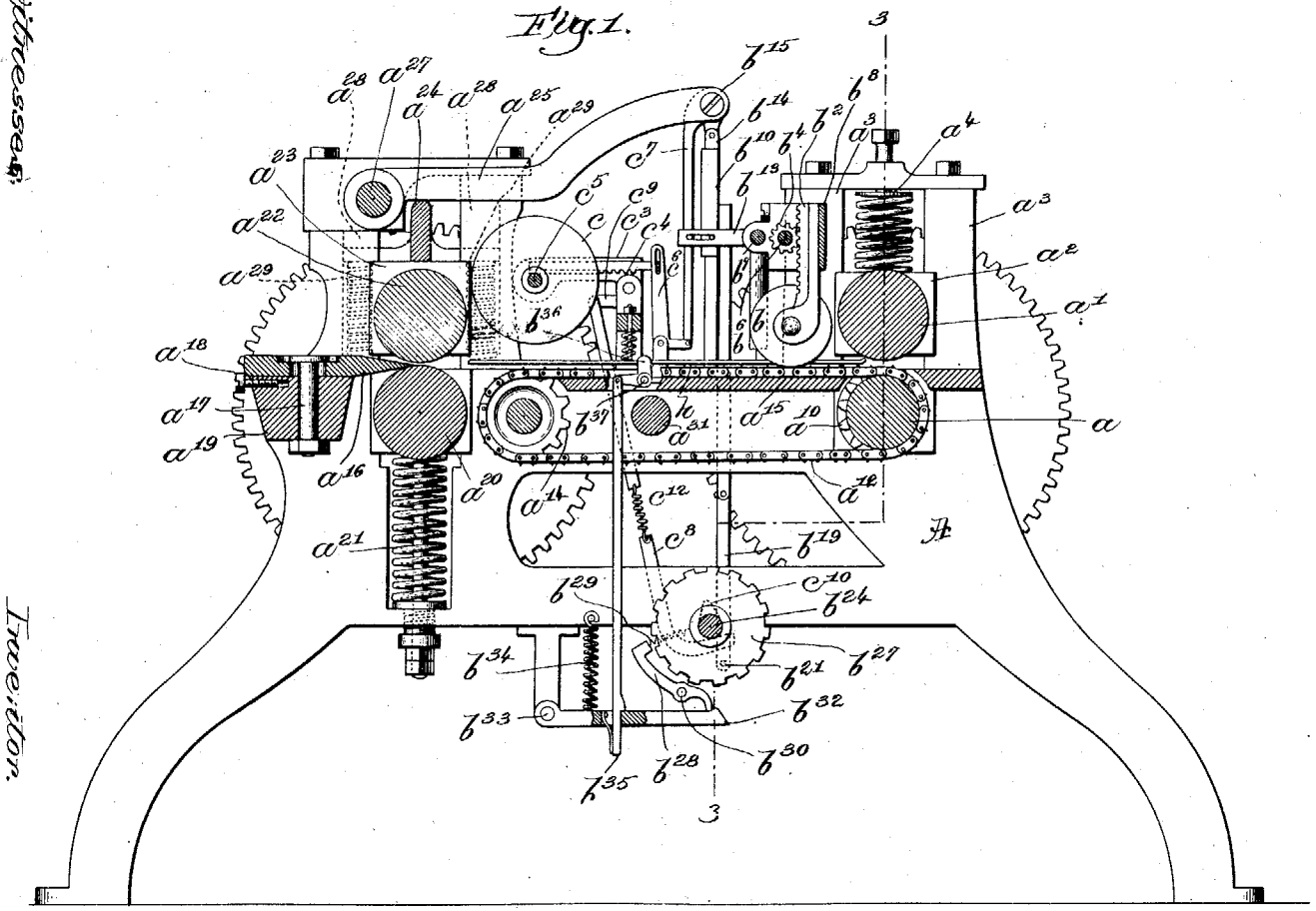

No. 12,288. REISSUED NOV. 22, 1904.

E. P. NICHOLS.

EVENING AND GRADING MACHINE.

APPLICATION FILED JAN. 13, 1904.

3 SHEETS—SHEET 1.

Witnesses:
Thomas J. Drummond
Edward F. Allen.

Inventor.
Elmer P. Nichols.
by Crosby & Gregory.
Attys.

No. 12,288. REISSUED NOV. 22, 1904.

E. P. NICHOLS.

EVENING AND GRADING MACHINE.

APPLICATION FILED JAN. 13, 1904.

3 SHEETS—SHEET 2.

Witnesses.
Thomas J. Drummond.
Edward H. Allen.

Inventor.
Elmer P. Nichols,
by Dewey, Gregory,
Atty's.

No. 12,288. REISSUED NOV. 22, 1904.

E. P. NICHOLS.

EVENING AND GRADING MACHINE.

APPLICATION FILED JAN. 13, 1904.

3 SHEETS—SHEET 3.

Witnesses.
Thomas J. Drummond,
Edward G. Allen.

Inventor.
Elmer P. Nicholls,
by Crosby, Gregory, Attys.

No. 12,288. Reissued November 22, 1904.

UNITED STATES PATENT OFFICE.

ELMER P. NICHOLS, OF MANCHESTER, NEW HAMPSHIRE, ASSIGNOR, BY DIRECT AND MESNE ASSIGNMENTS, TO THE LACENE MANUFACTURING COMPANY, A CORPORATION OF MAINE.

EVENING AND GRADING MACHINE.

SPECIFICATION forming part of Reissued Letters Patent No. 12,288, dated November 22, 1904.

Original No. 711,585, dated October 21, 1902. Application for reissue filed January 13, 1904. Serial No. 188,917.

*To all whom it may concern:*

Be it known that I, ELMER P. NICHOLS, a citizen of the United States, residing at Manchester, county of Hillsboro, State of New Hampshire, have invented an Improvement in Evening and Grading Machines, of which the following description, in connection with the accompanying drawings, is a specification, like letters of the drawings representing like parts.

The purpose of my invention is to do by machinery what has heretofore required the judgment of skilled hand-labor.

In certain kinds of heavy leather—such as employed for soles, taps, counters, and top lifts—the thickness varies considerably, and it becomes necessary to even it and "grade" it, as it is called in the trade, meaning thereby the shaving off or cutting away of the thicker portions and bringing the leather, usually after it has been cut out into soles, taps, &c., down to a uniform thickness throughout the piece and thereafter sorting or grading the different pieces as to thickness. The usual way in which this has heretofore been done is for a skilled operator to take each piece of leather and set a gage of a machine by hand for such thickness as he estimates by his experience and judgment corresponds to the thinnest portion of said piece of leather, a knife of the machine then shaving or cutting the leather down to the level of said gage, and the resulting piece may or may not be correctly evened, as it will be seen that it depends entirely upon the skill of the operator as he looks at and feels the leather, and after this evening has been done the grading, &c., are subsequently accomplished by hand, all these procedures requiring unusual skill, being necessarily slow and expensive and usually more or less inaccurate. Accordingly I have devised a machine which itself does all the work explained above and preferably accomplishes the entire operation automatically.

In the preferred embodiment of my invention the leather is simply fed into the machine, and feelers engage the leather at one or more points for automatically adjusting a gage to the thickness detected by the feelers, and the leather continuing on its way is then evened or shaved down to a uniform thickness corresponding to said adjustment, and finally the thickness of each piece is gaged and marked.

Further details and advantages and the operation and construction of my invention will be more fully pointed out in the course of the following description, reference being had to the accompanying drawings, in which I have illustrated a preferred embodiment of the invention, and the latter will be more particularly defined in the appended claims also forming a part of this specification.

Figure 2:
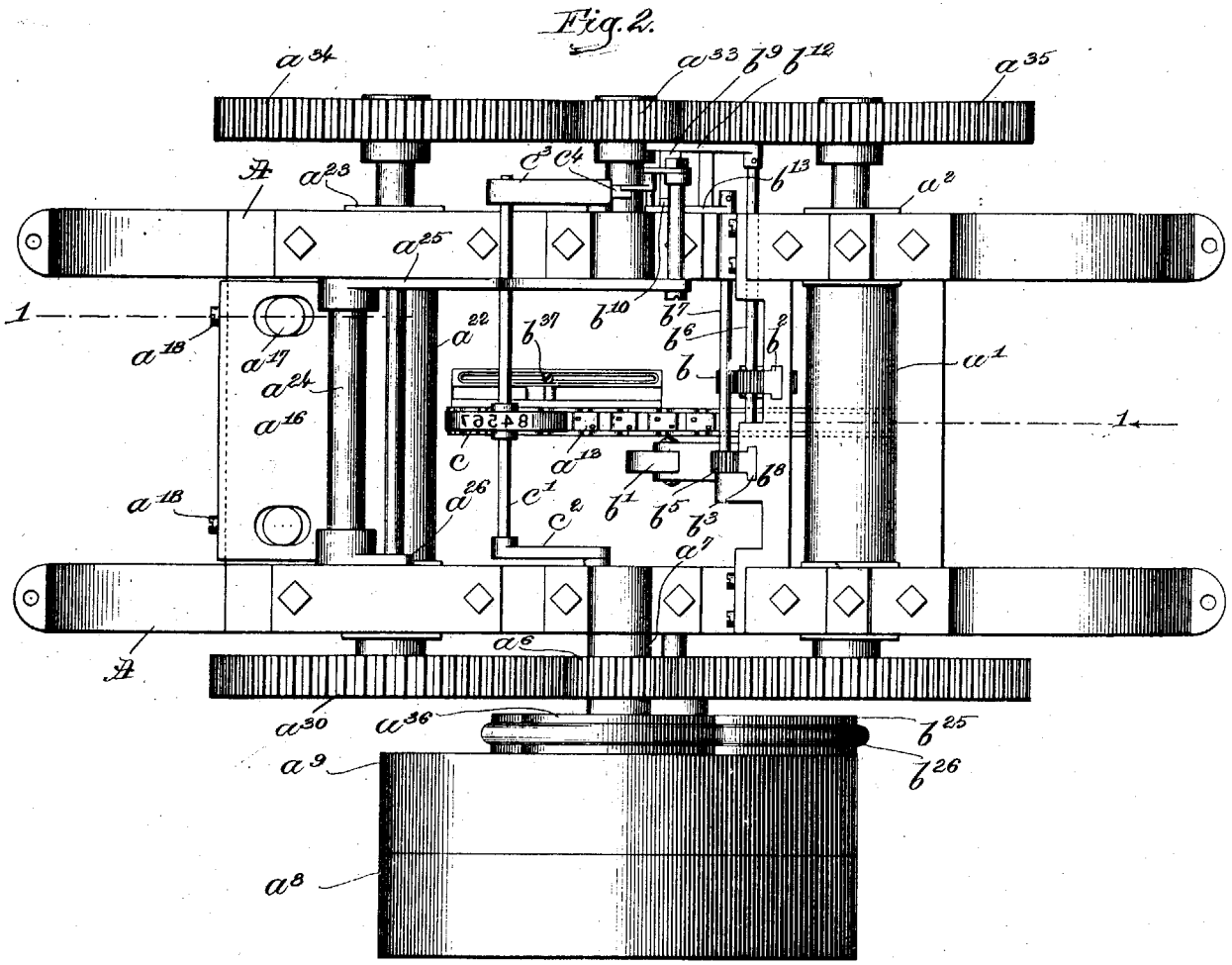
Figure 3:
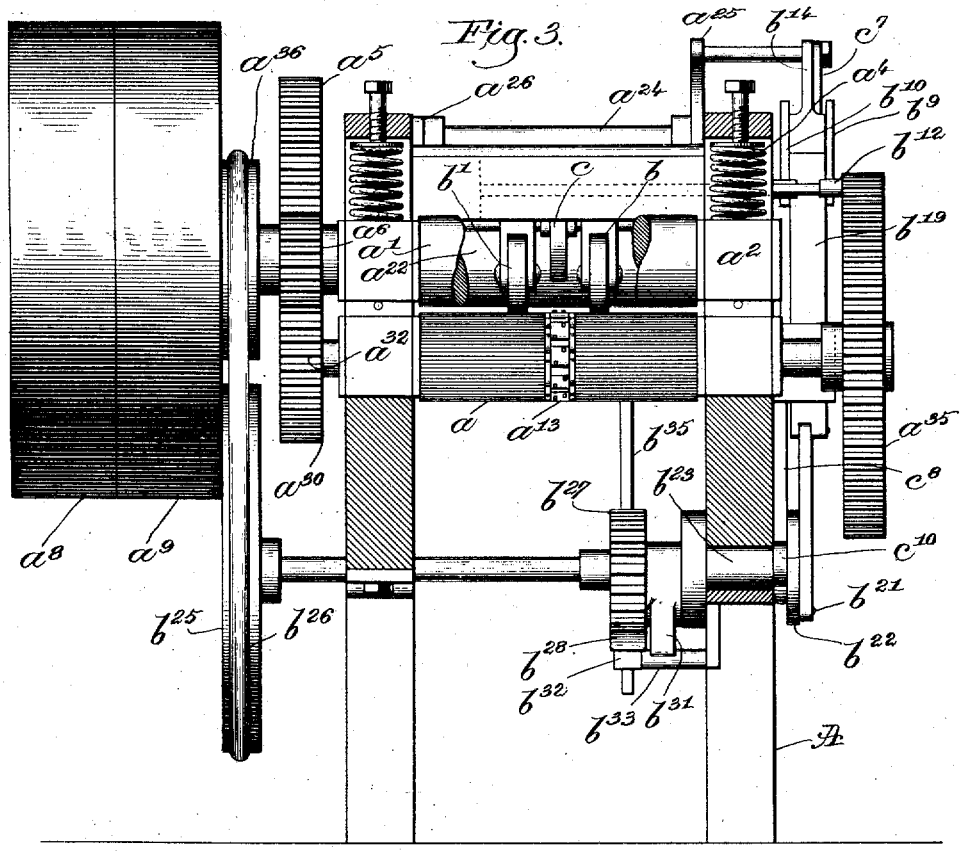
Figure 4:
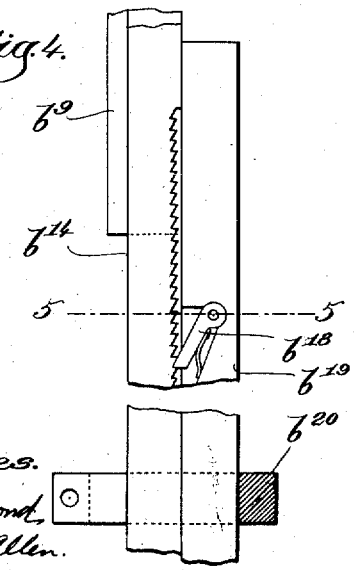
Figure 5:
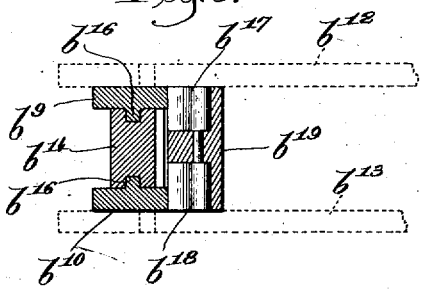

In the drawings, Figure 1 is a vertical longitudinal sectional view taken on the line 1 1, Fig. 2, partly broken away for convenience of illustration. Fig. 2 is a top plan view of the machine with the pressure-plates for holding the work on the feeding-chain omitted. Fig. 3 is a vertical transverse sectional view taken on the line 3, Fig. 1. Fig. 4 is a broken detail in side elevation of a portion of the gage-adjuster. Fig. 5 is a transverse sectional view thereof on the line 5 5, Fig. 4.

The work is fed in at the right-hand end of the machine, viewing Figs. 1 and 2, the feeding mechanism herein shown comprising a lower feed-roll $a$, suitably journaled at its ends in the frame A of the machine, and an upper presser-roll $a'$, whose journal-boxes $a^2$ are vertically movable in guides $a^3$ and normally held with a downward pressure by springs $a^4$, being provided at one end with a gear $a^5$, meshing with a pinion $a^6$ of a stub driving-shaft $a^7$, carrying fast and loose belt-pulleys $a^8$ $a^9$. The feed-roll $a$ is also provided with sprocket-teeth $a^{10}$ for engagement with a sprocket feed-chain $a^{12}$, provided with feeding-teeth $a^{13}$ here and there along its length, the sprocket-chain $a^{12}$ passing over a sprocket-idler $a^{14}$, so as to bring the teeth of the sprocket-chain into feeding position above the bed $a^{15}$ of the machine.

At some convenient place in the machine, herein shown as at its rear end, I provide a cutting-knife $a^{16}$, herein shown as adjustably held by clamping-bolts $a^{17}$ and set-screws $a^{18}$ in a block or cross-piece $a^{19}$ of the frame. Gaging-rolls coöperate with this knife and are shown herein as comprising a yielding lower or presser roll $a^{20}$, held upwardly by a spring $a^{21}$, and an unyielding top or gage roll $a^{22}$, whose journal-boxes $a^{23}$ carry a pressure-bar $a^{24}$, extending lengthwise of the roll to be engaged by gage-arms $a^{25}$ $a^{26}$, fast on a rock-shaft $a^{27}$. The roll $a^{22}$ is supported in guides $a^{28}$ at its opposite ends and provided with springs $a^{29}$ for holding it firmly against the arms $a^{25}$ $a^{26}$. The roll $a^{22}$ is driven by a gear $a^{30}$ in mesh with the pinion $a^{6}$, and suitably journaled in the frame of the machine beneath the bed is a shaft $a^{31}$, having a pinion $a^{32}$ at one end in mesh with the pinion $a^{6}$ and at its other end a pinion $a^{33}$, meshing at opposite sides with a gear $a^{34}$ for driving the lower gage-roll $a^{20}$ and a gear $a^{35}$ for driving the feed-roll $a$.

Conveniently located between the feed-rolls and gage-rolls I provide one or more feelers, there being herein shown for convenience of description and clearness of illustration two of these feelers $b$ $b'$, each in the form of a roll or wheel mounted, respectively, at the lower end of a suitable operating mechanism (shown as a rack-bar $b^{2}$ $b^{3}$) engaging two pinions $b^{4}$ $b^{5}$, whose shafts $b^{6}$ $b^{7}$ are journaled in a cross-bar $b^{8}$, in which also the racks are mounted, said shafts being connected, respectively, to the guard sets $b^{9}$ $b^{10}$ (shown in detail in Figs. 4 and 5) by means of slotted arms or cranks $b^{12}$ $b^{13}$. These guards slide on the opposite sides of a ratchet $b^{14}$, pivoted at $b^{15}$ to the free end of the arm $a^{25}$, being guided in any suitable manner on said ratchet, as by tongues and grooves $b^{16}$, and coöperating with said ratchet are pawls $b^{17}$ $b^{18}$, pivotally mounted in a pawl-carrier $b^{19}$, vertically guided at $b^{20}$ at the side of the frame and connected to a wrist-pin $b^{21}$ of a face-plate $b^{22}$, carried by a sleeve $b^{23}$, loose on a shaft $b^{24}$. The shaft $b^{24}$ is driven by a band-wheel $b^{25}$ and band $b^{26}$ from a band-pulley $a^{36}$ on the drive-shaft and carries a clutch, shown as a notched wheel $b^{27}$ fast on the shaft, to be engaged by a dog $b^{28}$, normally held by a spring $b^{29}$ toward the clutch and pivoted at $b^{30}$ to an arm $b^{31}$, fast on the sleeve $b^{23}$, so that when the clutch is locked with said sleeve the latter rotates and operates the gaging mechanism. The dog $b^{28}$ is normally held out of engagement with the clutch by a notched detent $b^{32}$, pivoted at $b^{33}$ to the frame, and held upwardly by a spring $b^{34}$, said detent being operated automatically by any suitable means, as by a plunger $b^{35}$, pivotally connected to a bell-crank $b^{36}$, adjustably pivoted in the bed of the machine at $b^{37}$ for different lengths of leather pieces and having its free arm projecting upwardly in the path of the leather pieces, so that as a piece is fed into proper position on the bed of the machine when its front end strikes the bell-crank $b^{36}$ it will thereby depress the same and release the dog $b^{28}$, so as to cause the automatic operation of the connected parts.

The adjustment of the bell-crank $b^{36}$ determines the point in the length of the leather piece for setting the mechanism which automatically controls the grade-marking means and also determines the portion of each piece for which the adjusting or controlling mechanism is non-responsive, as the feelers and connected mechanism are inactive or inoperative after the bell-crank $b^{36}$ has been tripped.

My invention as a distinct feature also includes an automatic grade-marking device, herein shown as comprising a marking-wheel $c$, provided on its periphery with the proper designations corresponding to the various thicknesses according to the current trade scale, said wheel being mounted on a shaft $c'$, supported at its ends in swinging journals $c^{2}$ $c^{3}$, the latter carrying a rack $c^{4}$, engaging at one end a pinion $c^{5}$ on said shaft, and at its other end being connected to a bell-crank $c^{6}$, operated by a link $c^{7}$, extending from the arm $a^{25}$ for properly rotating the wheel, so as to bring the correct stamping-number in proper position. The wheel is depressed by a rod $c^{8}$, connected at one end to a projection $c^{9}$ of the swinging journal $c^{3}$ and at its other end engaged by a cam-lug $c^{10}$ on the sleeve $b^{23}$. The rod $c^{8}$ is made yielding in any suitable manner, as by a spring $c^{12}$, for the purpose of permitting the wheel $c$ to accommodate itself automatically to different thicknesses of leather.

In operation the uneven stock is inserted between the rolls $a$ $a'$ and is positively fed forward thereby and by means of the feed-chain $a^{12}$, and as it passes beneath the feelers $b$ $b'$ they follow the unevennesses of the leather and correspondingly shift the guards or ratchet-adjusters, which shield the ratchet $b^{14}$, downwardly, as best shown in Fig. 4, thereby limiting to a corresponding extent the point of engagement therewith of the pawl-carrier, so that when the dog $b^{28}$ is tripped by the engagement of the forward end of the leather with the tripping device or bell-crank $b^{36}$ on the table the sleeve $b^{23}$ is caused to rotate with the shaft $b^{24}$, thereby at once pulling downwardly upon the pawl-carrier $b^{19}$, and as soon as either pawl $b^{17}$ or $b^{18}$ thereof is permitted to engage the ratchet $b^{14}$ further downward movement of the pawl-carrier acts through the ratchet to pull downwardly on the arm $a^{25}$ and lower the gage-roll $a^{22}$. This adjusts the gage-roll at precisely that distance above the edge of the knife $a^{16}$ which corresponds to the thinness of the leather, as determined by one or the other of the feelers $b$ $b'$, and as the leather passes between the rolls $a^{20}$ $a^{22}$ the former yields so as to permit the extra thickness of the leather to be shaved off by the knife, thereby reducing the entire leather piece in accordance with said adjustment. Meanwhile the marking-wheel $c$ has been rotated to correspond to the gaged thickness of the leather by reason of the fact that it is rotated to an extent corresponding to the downward movement of the arm $a^{25}$, said rotation being effected by the link $c^7$, bell-crank $c^6$, and rack-bar $c^4$, and as the leather gets along beneath said wheel $c$ the lever is suddenly brought down forcibly by means of the cam-lug $c^{10}$, which engages the crooked end of the rod $c^8$, the result being that the leather is stamped to indicate the precise thickness to which it has been gaged by the machine and is being dressed or cut.

It will be understood that for handling extra large pieces of leather I employ a large number of feelers; but for ordinary purposes, especially in handling died-out stock, two feelers and in some instances one feeler will be sufficient, the idea being simply to provide means which will feel or detect the thin portion or portions of the leather and set the gaging mechanism to correspond thereto, so that when the leather reaches the cutting mechanism of whatever kind it may be said mechanism will remove all stock over and above the thickness to which the gaging mechanism has thus been automatically set.

Preferably the marking of the pieces takes place as they pass from the feeding-in end of the machine to the cutting end, although it may be located elsewhere, and it may be of different construction, as the purpose is simply to designate or distinguish the different grades of leather, so that all those of one grade can be distinguished from those of different grades or thicknesses.

I do not intend to limit my invention to the specific details herein shown, as I am aware that many changes and substitutions may be resorted to within the spirit and scope of my invention.

However, besides claiming my invention broadly in terms commensurate with what I regard as novel and as constituting my general invention I have limited certain of my claims to more or less of the details of the present embodiment.

In practice it is essential that the pieces of leather being fed by the chain and impaled upon the points thereof be kept down upon the chain while the latter acts to feed the material through the machine. To effect this, I provide the machine with suitable yielding pressure-plates, one of which is represented at $h$. These plates may be sustained in any suitable manner with relation to the bed, so that they may yield and adapt themselves to the thickness of material being carried by the feeding-chain.

Having described my invention, what I claim as new, and desire to secure by Letters Patent of the United States, is—

1. A machine, comprising mechanism for evening or cutting off the thicker portions of uneven leather, and automatic means for adjusting said mechanism to the thickness of the leather at its thinner portions.

2. A machine, comprising mechanism for evening or cutting off the thicker portions of uneven leather, automatic means for adjusting said mechanism to the thickness of the leather at its thinner portions, and automatic mechanism for designating the different grades or thicknesses of the different pieces of leather put through the machine.

3. A machine, comprising means for permanently grading the different pieces of leather with reference to a corresponding location in all the pieces, and automatic mechanism for adjusting said means with relation to the thinner portions of the leather for said location in each piece.

4. A machine, comprising means for applying a distinguishing grade-mark to each piece of leather passed through the machine, and automatic controlling mechanism for selecting, with relation to the thinner portions of the leather, the particular grade-mark for each piece.

5. A machine, comprising means for applying a definite grade-mark to each piece of leather passed through the machine, automatic setting means operated by the leather piece for permanently setting said means for each piece, and operating mechanism for operating said means once only for each piece.

6. A machine, comprising means for applying a definite grade-mark to each piece of leather passed through the machine, and automatic controlling mechanism therefor actuated with reference to corresponding lengthwise localities of successive pieces, and once only for each piece.

7. A machine, comprising means for applying a definite grade-mark to each piece of leather passed through the machine, automatic mechanism for adjusting said applying means with relation to the thinner portions of the leather piece, and means for rendering said automatic mechanism non-responsive to a given portion of the leather piece.

8. A machine, comprising mechanism for evening or cutting off the thicker portions of uneven leather, and automatic means for designating the various thicknesses to which different pieces of leather are cut by said evening mechanism.

9. A machine, comprising cutting mechanism for evening an uneven piece of leather, feeding mechanism for feeding the leather thereto, and automatic gaging mechanism for setting the machine to cut the leather to the given thickness to which it is desired to be reduced.

10. A machine, comprising a cutter for evening an uneven piece of leather, feeding mechanism for feeding the leather thereto, a feeler adapted to follow the unevennesses of the leather, a gage roll or device for limiting the thickness to which the leather is to be cut, means for moving said gage device toward and from said cutter, and means connected with said feeler and said moving means for controlling automatically the extent to which the gage device is moved.

11. A machine, comprising a cutter for removing the thicker portions of an uneven piece of leather, a gage device for holding the leather at a predetermined distance from said cutter, and means for positively adjusting said gage device toward and from said cutter, consisting of a pawl and ratchet, a feeler, means actuated by said feeler for controlling the point of engagement of the pawl with the ratchet, and actuating means for reciprocating said pawl.

12. A machine, comprising a cutter for removing the thicker portions of an uneven piece of leather, a gage device for holding the leather at a predetermined distance from said cutter, means for positively adjusting said gage device toward and from said cutter, a feeler for automatically determining the adjustment of said gage device by the passage of the leather through the machine, and means actuated by the passage of the leather for operating said gage-adjusting means.

13. A machine, comprising grade-distinguishing means for marking the grade with reference to the thinness of the leather at corresponding regions of successive pieces, a feeler, and coöperating mechanism for automatically setting said means once for each piece and with reference to the same region for all of the pieces marked.

14. A machine, comprising marking means, automatic mechanism including a feeler for adjusting said means with relation to the thinner portions of the leather, and adjustable means for varying the effective position of operativeness of said feeler with relation to the leather.

15. A machine, comprising a cutter for removing the thicker portions of an uneven piece of leather, feeding mechanism for feeding the leather thereto, a gage device, means for adjusting said gage device, a feeler automatically regulating said adjusment to the thickness required, and mechanism for causing said adjusting means to operate, said mechanism being set in motion by the passage of leather, and being adjustable for different lengths of leather.

16. A machine, comprising a cutter for removing a portion of the leather, a yielding roll on one side thereof, and an unyielding roll on the other side thereof, the latter constituting a gage device and being provided with means for positively moving it toward and from the cutter, and automatic means for regulating the extent of movement according to the leather passing through the machine.

17. A machine comprising a cutter for removing a portion of the leather, a gage device, means for adjusting said gage device, a work-support, a feeler movable above said work-support and adapted to be raised and lowered by the passage of the work, and a guard actuated by said feeler for controlling the operative movement of said gage device by its adjusting means.

18. A machine, comprising a cutter for removing a portion of the leather, a gage device, means for adjusting said gage device, a work-support, a feeler movable above said work-support and adapted to be raised and lowered by the passage of the work, and a guard actuated by said feeler for controlling the operative movement of said gage device by its adjusting means, a marking-wheel, means for rotating said wheel to correspond to the extent of adjustment of the gage device, and means for engaging the wheel with the leather.

19. A machine, comprising a cutter for removing a portion of the leather, a gage device, a lever for moving said gage device toward and from the cutter, longitudinally-movable means for actuating said lever, said means being made in two parts adapted to be locked together at times for movement, a feeler, and means actuated thereby for governing the locking together of said two parts.

20. A machine, comprising a cutter for removing a portion of the leather, a gage device, a ratchet, connections therefrom for moving said gage device toward and from the cutter, a pawl and pawl-carrier, means for reciprocating said pawl-carrier, a feeler, and a guard having connection with said feeler and movable along said ratchet in the path of said pawl-carrier for controlling the point of engagement of the pawl with the ratchet.

21. A machine, comprising a cutter for removing a portion of the leather, a gage device, a ratchet, connections therefrom for moving said gage device toward and from the cutter, a pawl and pawl-carrier, means for reciprocating said pawl-carrier, a plurality of feelers movable with relation to the leather at different points, and a guard connected with each feeler and movable along said ratchet in the path of said pawl-carrier for controlling the point of engagement of the latter with the ratchet.

22. A machine, comprising a cutter for removing a portion of the leather, a gage device, a lever for moving said gage device toward and from the cutter, adjusting mechanism for automatically moving said lever according to the thickness of the leather, a marking-wheel provided with grade-marks for stamping the leather, means connected with said lever for rotating said wheel to bring the proper grade-mark opposite the leather, indicating the thickness to which the gage device has been set, and means for bringing said wheel into contact with the leather.

In testimony whereof I have signed my name to this specification in the presence of two subscribing witnesses.

ELMER P. NICHOLS.

Witnesses:
GEO. H. MAXWELL,
THOMAS J. DRUMMOND.